United States Patent [19]

Kostal et al.

[11] Patent Number: 4,960,315
[45] Date of Patent: Oct. 2, 1990

[54] ATMOSPHRIC OPTICAL COMMUNICATION LINK

[75] Inventors: Hubert Kostal, Manahawkin; Rodney C. Luhn, Leonardo; Donald E. Smith, Colts Neck, all of N.J.

[73] Assignee: AT&T Bell Laboratories, Murray Hill, N.J.

[21] Appl. No.: 354,527

[22] Filed: May 19, 1989

[51] Int. Cl.⁵ .................................................. G02B 6/32
[52] U.S. Cl. ................................ 350/96.18; 350/96.15
[58] Field of Search ............................ 350/96.18, 96.15

[56] References Cited

U.S. PATENT DOCUMENTS 4,844,574  7/1989  Chande .............................. 350/96.18

*Primary Examiner*—William L. Sikes
*Assistant Examiner*—Robert E. Wise
*Attorney, Agent, or Firm*—Eli Weiss

[57] ABSTRACT

This invention is a mobile, short range, high data rate, high availability atmospheric optical communication link which can be used to temporarily bridge a break in an optical fiber network. Briefly, the invention comprises two transceivers, one at each end of a break, to bridge a severed optical fiber via an atmospheric optical transmission path which can extend for a distance of roughly 5 miles. A special light source is not required. The light transmitted through the atmosphere is the low power light emitted from the end of an optical fiber and generated by an optical regenerator normally used to generate light only for transmission through an optical fiber. The light is first expanded and collimated for atmospheric transmission and then transmitted to a receiver. At the receiver, the diameter of the received beam is optically reduced by focusing it onto the end of an optical fiber for coupling the light into the fiber. The optics for the transmitter and receiver can be mounted on a platform that adjusts in real time to optimize the signal received. Optical alignment can be automatically maintained by computer controlled transmitter steering and receiver tracking. The transmitters and receivers required no communication other than the incoming beam to maintain optical alignment and does not require additional bits in the data stream for telemetry.

6 Claims, 1 Drawing Sheet

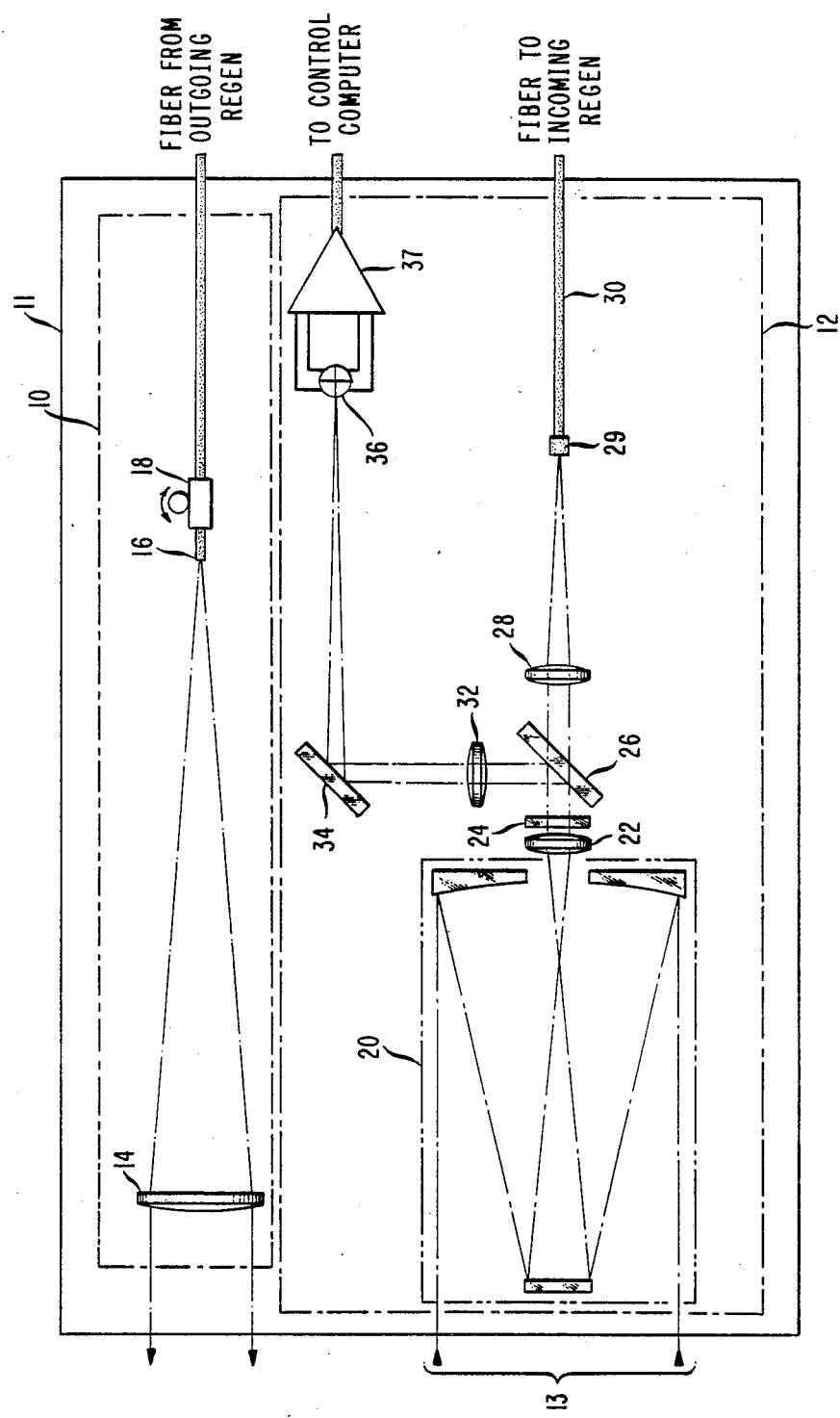

ATMOSPHRIC OPTICAL COMMUNICATION LINK

TECHNICAL FIELD

This invention relates generally to an optical fiber communication link and, more particularly, to an optical atmospheric communication link which can be used to provide a transmission bridge around a break in an optical fiber communication system.

BACKGROUND OF THE INVENTION

Optical fiber is being used extensively to provide communication paths in both local and long-haul networks. As the use of optical fiber for communications expands, there is a growing need for rapid on-site restoration of catastrophic fiber damage to minimize the effects on the network of accidental cuts. Catastrophic fiber damage is defined as being those situations where, because of the terrian or the type of disaster, ordinary restoration methods will require more than 12 hours to provide full service and the total revenue at risk after 6 hours of outage time will exceed $1 million. Frequently, long-haul fiber is located along a railroad right-of-way and is normally buried approximately three feet below ground level. It is not unusual, during a derailment, for a train to completely sever the optical cable. The time required to repair the severed cable will depend largely upon gaining access to the accident site. Obviously, if the derailment included a freight train carrying toxic materials, the optical fiber repair crew may be denied access to the accident site for many days. In many instances where an optical cable was cut, regardless of the cause, the time required for the cable to be repaired and service to be fully restored was over 6 hours. In several instances the outages exceeded 15 hours. If, in each instance, service could have been restored within 6 hours of the break, many hundreds of thousands of dollars in direct costs would have been saved.

SUMMARY OF THE INVENTION

This invention is a mobile, short range, high data rate, high availability atmospheric optical communication link which can be used to temporarily bridge a break in an optical fiber network. Briefly, the invention comprises two transceivers, one at each end of a break, to bridge a severed optical fiber via an atmospheric optical transmission path which can extend for a distance of roughly 5 miles. Each transceiver is positioned (i.e., elevated as required) using a temporary structure to obtain a line-of-sight transmission path. The transceiver is an optical device that expands a low-powered laser beam from an optical fiber for atmospheric transmission and focuses the received beam onto the end of an optical fiber for signal detection. The optics are mounted on a platform that adjusts in real-time to optimize the received signal level. Optical alignment is automatically maintained by a computer controlled transmitter steering and receiver tracking system after initial deployment.

BRIEF DESCRIPTION OF THE DRAWING

FIG. 1 is a schematic diagram of the transceiver optics mounted on a stabilized platform in accordance with the principles of the invention;

DETAILED DESCRIPTION

Referring to FIG. 1, there is illustrated the transmission optics 10 and the receiving optics 12 of a transceiver. The optics are mounted on a common platform 11 which is computer stabilized for pitch and yaw.

The transmission optics consists of a converging lens 14 positioned to receive optical energy directly from the end of an optical fiber 16. The transmission optics is a refractive collimation arrangement. The numerical aperture of a single mode optical fiber optically matches closely to a 4-inch diameter 500 mm focal length lens. Light from the end of the optical fiber 16 is formed into a collimated beam of light having a diameter of four inches. A mechanical or electro-mechanical drive apparatus 18 coupled to the optical fiber 16 can be used to vary the size of the beam at a remotely located receiver by either directly or remotely moving the end of the optical fiber 16 toward and away from the focal point of the 500 mm lens 14. Thus, the diameter of the transmitted light beam can be set to an optimum size regardless of the distance between the transmitter and the remote receiver. Additional direct or remote control of the fiber's vertical and/or horizontal position in the focal plane permits changes to be made to the path of the outgoing beam axis. These adjustments to the output light beam facilitate the overall system alignment. The transmitter optics have an inherently low geometric beam expansion rate of approximately 1.3 inches per mile of path. Thus, as the beam travels from the transmitter to the receiver, practically all of the expansion which the beam experiences is due to atmospheric effects.

Referring to the receiving optics 12, light 13 from a remotely positioned transmitter (i.e., light from transmission optics 10) is collected in a Schmidt-Cassegrain telescope 20. Light from the telescope 20 is collimated by using a converging lens 22. The light is then filtered for spectral components by a narrow bandpass filter 24. The light from the narrow bandpass filter 24 is directed toward a beam splitter 26. The beam splitter passes 80% of the collected light to a 150 mm lens 28. The lens 28 focuses the received light onto the end of an optical fiber 30 for transmission to an incoming optical regenerator. Coupling of the light from the lens 28 into the fiber 30 is facilitated by the use of a GRaded INdex (GRIN) lens 29. Alignment of the GRIN lens is critical for coupling the received light into the fiber.

20% of the light is reflected by the beam splitter 26 and is passed through a 500 mm converging lens 32, reflected by a mirror 34 and is focused onto a tracking photodiode 36. The tracking photodiode is a quadrant device which has four separate diodes each arranged to occupy a ¼ pie shaped section of a circle. It is used to sense the position of a spot of light on its surface. It is to be noted that there is a one-to-one relationship between the quadrant diode focal point and the fiber coupling focal point. The physical positioning of the quadrant diode determines where the fiber focal point will be located in space. Each quadrant of the diode is connected, via an electrical conductor, to an amplifier 37, the output of which is coupled to a control computer. The control computer samples the output signal from the amplifier a number of times per increment of time to obtain an average and, using this information, generates a signal which is used to orient the position of the platform 11 upon which the receiver and transmitter optics are mounted. The positioning of the platform helps to optimize the signal received.

The optics of the receiver can be viewed as being two separate lens systems, each having a different effective focal length. One lens system corresponds to the optical path which terminates at the quadrant photodiode 36 and the other lens system corresponds to the optical path which terminates at the optical fiber 30. The calculated effective focal length for the first lens system which terminates at the optical fiber is about 27.2 m; and, the calculated effective focal length for the other lens system which terminates at the quadrant photodiode is about 8.1 m. The quadrant diode is 5 mm in diameter and the ratio of the diameter of the diode to the effective focal length defines the field of view for the diode. The field of view for the quadrant diode optics is approximately 1.1 E-2 degrees. Thus, the receiving optics can "see" a circle having a diameter of 1 ft/mile.

The choice of optics for each lens system is dependent upon the optical fiber coupling requirements. Light which enters the GRIN lens 29 is limited to light which comes from a cone having an opening angle of 1.0 degree. Given the diameter of the light beam which leaves the first convergent lens 22, a focal length of at least 150 mm is required to match the entrance cone. The requirement for the optics which terminate at the quadrant diode is that the beam motion on the surface of the diode due to tracking was experimentally determined to be at least three times that of the GRIN lens coupling optics. This suggests that for an angle-of-arrival change, the beam spot on the GRIN lens will experience ⅓ the displacement of the beam spot at the quadrant diode. This helps to minimize intensity fluctuations of the light entering the fiber 30 which are caused by tracking dither.

The connections between the optical systems and the communications network which experiences a distruption of service can be considered to consist of a number of areas. One area can be considered to consist of the optical-to-electrical (incoming regenerator) and electrical-to-optical (outgoing regenerator) optical regenerators which are coupled to the fibers 30 and 16. The optical regenerators determined the value of the maximum output power and the minimum receive power. The optical characteristics of an optical regenerator is determined by its maximum average output power and its minimum average input power at a given bit error rate. The maximum laser output is 1 dBm and, as this invention is considered to be unreliable at a bit error rate of 10 E-3, the minimum detector input at this bit error rate is measured at −36 dBm for the type FT series G transmission regenerator manufactured by AT&T. This allows a maximum of 37 dB of total loss on the optical path if acceptable performance is to be maintained. Thus, the optics should impose total path losses of much less than 37 dB to permit the overall system to experience as large an atmospheric fade as possible without failing. The FT series G optical regenerators manufactured by AT&T have a receiver optical input dynamic range of about 20 dB. Thus, any optical signal which is greater than −13 dBm will overload the receiver section of this invention and cause an increase in the overall bit error rate.

Loss calculations due to optical components are normally well defined. Generally, there is a 1 dB loss for every three optical surfaces encountered. Biconic fiber connectors add 0.5 dB and 1 dB losses for multimode and single mode fibers, respectively. Additional losses by the bandpass filter and the beam splitter are 3 dB and 1 dB, respectively. Two additional losses which must be included are from the collection telescope 20 and that loss which is caused by coupling the collected light into the fiber. The GRIN lens helps to facilitate the coupling of the collected light into the filter. It has been found to be helpful if the GRIN lens-optical fiber assembly is mounted so that its position is adjustable within the focal plane. Pitch and yaw of the GRIN lens with respect to the optical axis must also be adjustable on a fine scale. This gives a total of four independent position adjustments which require adjustment to provide the best optical coupling. Under ideal conditions, the optical arrangement of FIG. 1 resulted in a coupling loss of 3 dB into a 50 micrometer core diameter fiber.

The loss of received power due to telescope coupling results primarily from the beam size at the receiver plane being larger then the collection aperture. As noted previously, beam size at the receiver is primarily determined by geometric spread and atmospheric spread. Geometric spread of the beam is related to the size of the source and the focal length of the collimation system and, for this invention, it is not severe. The effect of the atmosphere on beam spreading is not fully understood. However, based upon field tests, it can be assumed that for a beam path of two miles, there will be a 10-inch beam spread. With our invention, as illustrated in FIG. 1, the loss is approximately 1.3 dB for a light beam path of approximately two miles.

For the embodiment of the invention illustrated in FIG. 1, the total losses for the entire system is about 13 dB when the transmitter is spaced approximately 2 miles from the receiver. More specifically, the loss due to optical elements is about 5 dB; for the bandpass filter it is about 3 dB; for the telescope collection area it is about 2 dB; and for the fiber optic coupling it is about 3 dB. It is assumed that the transmission path through the atmosphere has no losses. Thus, the light beam, as it travels through the atmosphere, must have an optical fade which is greater than 24 dB for the bit error rate to be greater than 10 E-3 and become unreliable.

It is estimated that a visibility of less than one mile is required to cause a total path attenuation of 24 dB. Statistics from metropolitan area airports in the United States of America show that a visibility of less than one mile is an unusual event and occurs in less than 2% of all sightings. This implies that this invention can be expected to perform without outage on over 98% of all days.

It is well known that an optical beam will change its trajectory as it propagates through varying refractive indices present along an atmospheric path. Because of this, any highly collimated beam will shift its position on the collecting aperture. To compensate for this type of beam motion, a steering-tracking system is employed. In the operation of this invention, it is assumed that reciprocity exists for light beams traveling point-to-point in opposite directions. Thus, where there are two optical transceivers which are sending optical beams to each other, if the beam at one transceiver bends upward, then the beam from the other transceiver will experience a similar upward bend. Now, if each transceiver can detect this change in the angle of arrival and correct for the change on the transmitter and receiver optics axis, each beam will again be centered on the collecting aperture. A main advantage of this symmetry is that the two transceivers can operate independently of each other (i.e., they do not require any communication link other than the incoming beam). More specifically, no additional bits are required in the data stream for telemetry. This method simplifies the controls which are required for optical alignment of the transceivers and inherently allows for a bidirectional fiber pair to be restored automatically. Another advantage of this type of steering tracking is that each transceiver can use the incoming beam as its reference. Thus, if there is any local motion from the transceiver platform, the tracking system can compensate for this motion without changing the trajectory of its outgoing beam provided the tracking speed is adequate for the vibrations the platform may experience.

In the invention, as illustrated in FIG. 1, the beam spot position on the quadrant diode 36 is continuously monitored and the optical platform 11 is continuously positioned to keep the beam spot centered on the diode. The positioning of the optical platform can be considered to include four distinct procedures. First, the light intensity which falls on each quadrant of the diode is converted to a voltage, and these voltages are summed in a control computer to provide a total voltage for the upper, lower, left and right quadrant. Second, these sums are sampled by, for example, a 12 bit analog-to-digital converter. The use of software allows the diode to be sampled a number of times and an average of the obtained samples is used for tracking adjustment calculation. Third, a number of calculations are performed to determined the number of steps required to move each axis through the required displacement and then a command is sent to the platform controller. The last procedure is the execution of the motion required. In one embodiment of the invention, the tracking cycle is executed at a rate of up to 17 cycles/second. This rate depends on a number of software related parameters. The maximum number of table steps allowed in one cycle is one such parameter and tends to be the major contributor to the execution rate. However, the execution time can also be increased by sampling the tracking photodiode more than 5 times per cycle. The number of tracking cycles per second is maximized to avoid degrading the tracking performance.

In operation, the incoming and outgoing beams to each transceiver must follow substantially parallel paths separated by a physically small distance compared with the total path length. Actually, two pairs of optical axes must be made collinear. To do this, it is helpful if there is internal and remotely controllable adjustments of the different axes. By moving the transmitting fiber 1 mm off the focal point, the beam will move 21 feet when the optical path is two miles long. This implies that gross positioning of each beam can be accomplished with minute fiber motions but alternately small variations in receive versus transmit axes can make for large misalignments over a two mile path.

One technique for initial alignment begins with one transceiver tracking the incoming beam from the other transmitting transceiver which is held stationery. Each site notes the coordinates which are necessary for that condition. Then the roles are reversed and new coordinates are found. The difference in a particular transceiver's coordinates for these two conditions (once while tracking only and once while sending only) is related to the angular difference in the local receive and transmit optical axes. A system is in alignment when this difference is zero for both transceivers. To zero the difference in coordinates, manual adjustment of each transceiver's transmission axis by moving the fiber position in the appropriate direction may be required. Some additional comments on alignment between the quadrant photodiode axis and the fiber coupling axis on the receive optics are appropriate at this time. Specifically, once the quadrant photodiode is positioned, the GRIN lens focal plane is determined provided no other optical elements are distrubed. In addition, in the transceiver-to-transceiver alignment process, if the receive optics is not adjusted during the procedure, the GRIN lens to quadrant photodiode coupling is not affected.

In the invention, the optical energy which is transmitted approximately 2 miles through the atmosphere to a remotely located transceiver is generated by the optical regenerator which is normally used to generate light only for transmission through an optical fiber. Thus, the optical regenerator which generates light for transmission through an optical fiber for receipt by another regenerator is the only source of optical energy which is transmitted through the atmosphere for a distance which can be in excess of two miles. This invention, by using the optical energy from an optical regenerator which emerges from the end of an optical fiber, avoids the need of special high power laser to transmit along a path which can be in excess of two miles through the atmosphere.

We claim:

1. An atmospheric optical communication device characterized by an optical regenerator, an optical fiber having one end coupled to receive optical energy from said optical regenerator, a four-inch diameter 500 mm focal length converging lens coupled to receive and collimate an expanded beam of optical energy from said optical regenerator which exits the other end of said optical fiber for transmission to an optical receiver.

2. An atmospheric optical communication device characterized by an optical regenerator, a first optical fiber having one end coupled to receive optical energy from said optical regenerator, a collimating lens coupled to receive and collimate an expanded beam of optical energy from said optical regenerator which exits the other end of said optical fiber, optical energy collecting means oriented to receive optical energy from said collimating lens, a second optical fiber coupled to receive optical energy from said collimating lens and a graded index lens coupled to an end of said second optical fiber to facilitate the coupling of light into said fiber.

3. The atmospheric optical communication device of claim 2 wherein said optical energy collecting means is a telescope.

4. The atmospheric optical communication device of claim 3 further characterized by a first converging lens interposed between said telescope and said graded index lens to collimate the optical energy from said telescope, and a second converging lens interposed between said first converging lens an said graded index lens to focus the collimated optical energy at the graded index lens.

5. The atmospheric optical communication device of claim 4 further characterized by a tracking quadrant photodiode, a beam splitter interposed between said first converging lens and said second converging lens to direct a portion of said collimated light to said photodiode, a third converging lens positioned between said beam splitter and said photodiode to form said collimated lens from said beam splitter onto said photodiode.

6. An atmospheric optical communication device characterized by an optical regenerator, an optical fiber having one end coupled to receive optical energy from said optical regenerator, a collimating lens coupled to receive and collimate an expanded beam of optical energy from said optical regenerator which exits the other end of said optical fiber for transmission to an optical receiver, a stable platform coupled to support said optical fiber and said collimating lens, a telescope coupled to said stable platform to receive optical energy from a remotely located optical transmitter, an optical fiber having an end coupled to said platform, a graded index lens coupled to said end of said optical fiber to facilitate coupling optical energy into said fiber, a first converging lens supported by said platform interposed between said telescope and said graded index lens to collimated the optical energy from said telescope, a second converging lens supported by said platform interposed between said first converging lens and said graded index lens to focus the collimated optical energy at the graded index lens, a tracking quadrant photodiode supported by said platform, a beam splitter supported by said platform interposed between said first converging lens and said second converging lens to direct a portion of said collimated light to said photodiode, a third converging lens positioned between said beam splitter and said photodiode to focus said collimated beam from said beam splitter onto said photodiode drive, means coupled to provide pitch and yaw motions to said platform, and control means coupled to said photodiode and said drive means to orient said platform to maintain the light from said second converging lens on said photodiode.

* * * * *